(12) United States Patent
Ezaki et al.

(10) Patent No.: US 6,917,157 B2
(45) Date of Patent: Jul. 12, 2005

(54) ELECTRODE FOR ELECTRON SOURCE, METHOD FOR PRODUCING THE SAME, AND ELECTRONIC TUBE USING THE SAME

(75) Inventors: Tomotaka Ezaki, Ise (JP); Sashiro Uemura, Ise (JP); Junko Yotani, Ise (JP); Hiromu Yamada, Ise (JP); Takeshi Nagasako, Ise (JP); Hiroyuki Kurachi, Ise (JP); Kazunori Tatsuda, Ise (JP); Yukiharu Seko, Ise (JP); Tsuyoshi Maesoba, Ise (JP)

(73) Assignee: Noritake Co., Ltd., Aichi (JP)

( * ) Notice: Subject to any disclaimer, the term of this patent is extended or adjusted under 35 U.S.C. 154(b) by 66 days.

(21) Appl. No.: 10/164,798

(22) Filed: Jun. 7, 2002

(65) Prior Publication Data

US 2003/0001478 A1 Jan. 2, 2003

(30) Foreign Application Priority Data

Jun. 28, 2001 (JP) .................................... P2001-196020
Apr. 22, 2002 (JP) .................................... P2002-118942

(51) Int. Cl.[7] .............................. H01J 1/30; H01J 1/52
(52) U.S. Cl. ........................ 313/497; 313/326; 313/306; 313/352

(58) Field of Search ................................ 313/309, 336, 313/351, 495, 497, 326, 310, 311, 355, 512, 514, 484, 574, 581, 352, 634

(56) References Cited

U.S. PATENT DOCUMENTS 6,239,547 B1   5/2001   Uemura et al.
6,650,061 B1 * 11/2003  Urayama et al. ........ 315/169.3

FOREIGN PATENT DOCUMENTS

JP         2002-133999         5/2002

* cited by examiner

Primary Examiner—Ashok Patel
(74) Attorney, Agent, or Firm—Hedman & Costigan, P.C.

(57) ABSTRACT

Disclosed is an electrode for an electron source, a method for producing the same, and an electronic tube using the same which provide a decreased thickness of an electron emitting source, and an improved current distribution percentage. The electronic tube comprises a substrate, an electron emitting source area formed on the substrate, and a shield area around the electron emitting area. The shield area is formed of a material that does not produce an electron emitting source, when the electron emitting source is produced by a dry method. As a result, if a space between an electron drawing electrode and the electrode for the electron source is narrow, the percentage of anode current increases in the total current, thereby improving the current distribution percentage.

3 Claims, 7 Drawing Sheets

ELECTRODE FOR ELECTRON SOURCE, METHOD FOR PRODUCING THE SAME, AND ELECTRONIC TUBE USING THE SAME

BACKGROUND OF THE INVENTION

The present invention relates to an electrode for an electronic source, a method for producing the same, and an electronic tube using the same.

Known electrode tubes include a fluorescent display tube in which electrons emitted from an electron source disposed at a side of a cathode electrode are collided with a light emitting part comprising a fluorescent layer formed on a counter electrode to emit light. The electron tube is one of vacuum micro devices using sub-micron to micron order of micro electron emitting sources. A basic structure of the electron tube is a triode similar to that of a conventional vacuum tube. However, the electron tube does not use a hot cathode electrode, but uses an electron emitting source as the electrode. In the electron emitting source, a cathode electrode (emitter) is applied high electric field to draw electron through the quantum mechanics tunnel effect.

The drawn electrons are accelerated by a voltage between anode and cathode electrodes, and are collided and excited with the fluorescent layer formed on the anode electrode to emit light. It utilizes the same principle as that of a cathode ray tube in that a phosphor is excited by a cathode ray to emit light. The electron tube is advantageous over the cathode ray tube because the electron tube has decreased volume, weight, and electric power consumption. In addition, a device utilizing the electronic tube does not require a back light, and has a wide visual field as compared to a liquid crystal display device.

Figure 6:
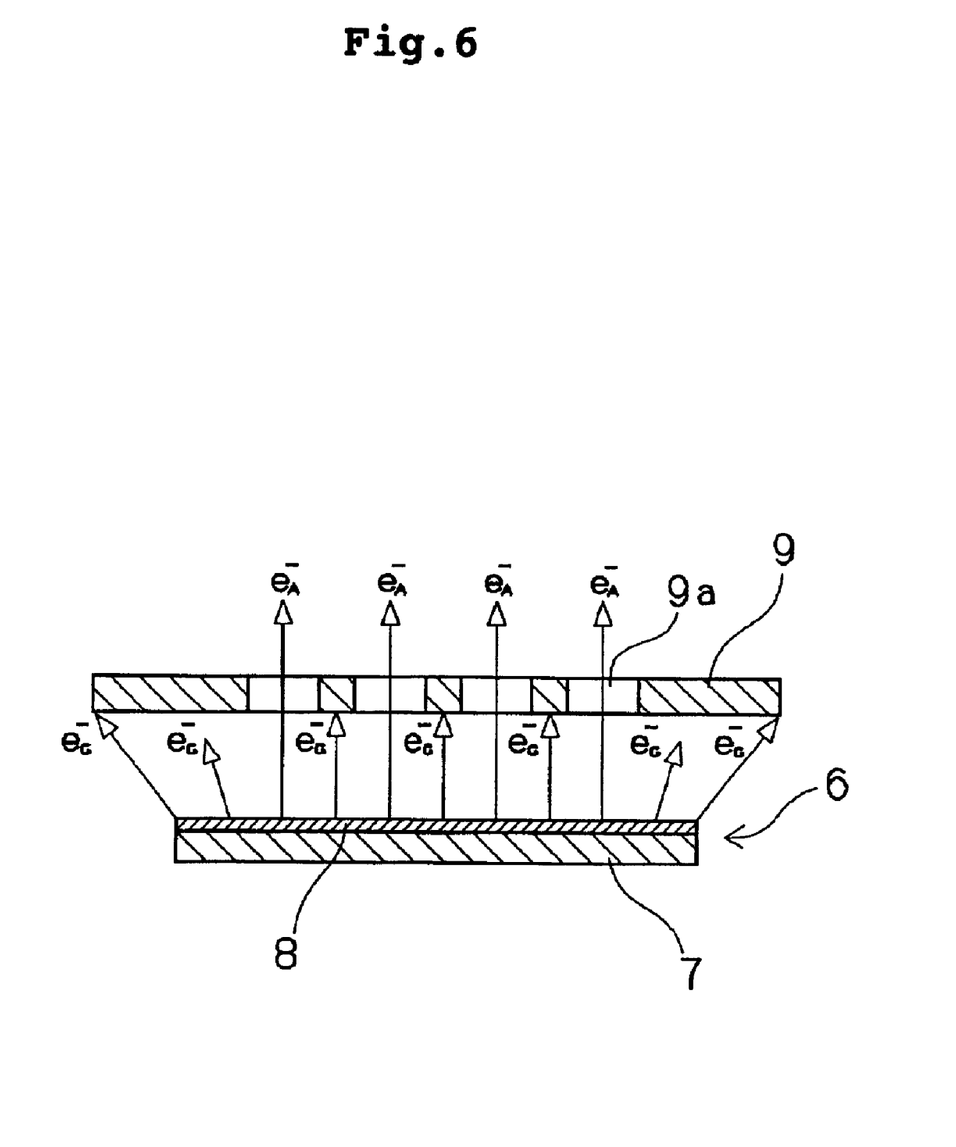
FIG. 6 is a cross-sectional view showing an example of an electrode for an electron source including no shield area.
Figure 7:
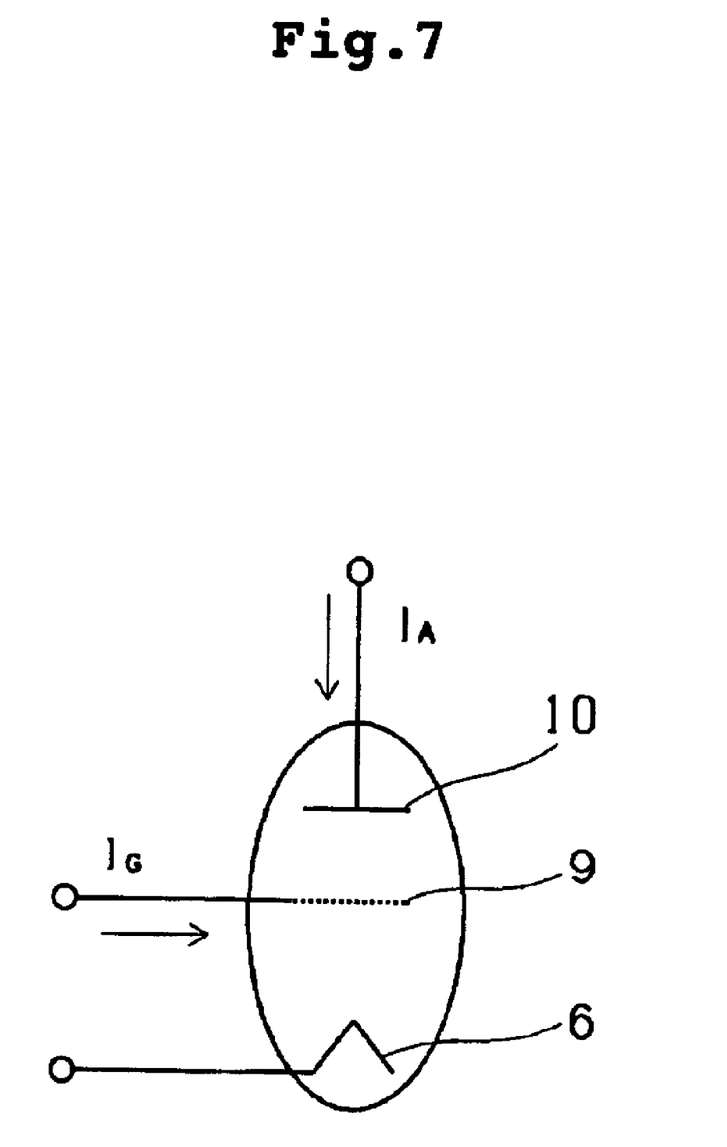
FIG. 7 is a diagram showing a structure of an electronic tube including an anode electrode and an electrode for an electron source including no shield area.

FIGS. 6 and 7 show one example of the electrode for the electron source. FIG. 6 is a view showing structures of a cathode electrode and an electron drawing electrode. FIG. 7 is a view showing a structure of an electron tube comprising an anode electrode as well as the cathode and electron drawing electrodes.

An electrode for the electron source 6 used as the cathode electrode comprises a conductive substrate 7, an electron emitting source 8 such as carbon nanotube, and diamond-like carbon formed on a surface of the substrate 7. An electronic drawing electrode 9 having a mesh part 9a formed in a lattice is disposed substantially parallel to the electron emitting source 8.

In such a structure, a voltage is applied such that the electron drawing electrode 9 has positive potential against the electrode for the electronic source 6, which induces field electrons emission. Thus, the electrons are drawn from the electrode for the electronic source 6. Some drawn electrons flow into the electron drawing electrode 9, and others pass through the mesh part 9a and flow into an anode electrode 10 as shown in FIG. 7.

However, in the electrode structures shown in FIGS. 6 and 7, the numbers of the electrons flowing into the electron drawing electrode 9 are greater than that of the electrons passing through the electron drawing electrode 9 so that the phosphor makes light emission. The percentage of anode current $I_A$ in the total current is low. The total current is grid current $I_G$ plus the anode current $I_A$, and the percentage is hereinafter referred to as a "current distribution percentage". The potential of the electron drawing electrode 9 is distributed parallel to the electrode for the electronic source 6 used as the cathode electrode. Accordingly, the numbers of electrons $e_G^-$ emitted from the electrode for the electronic source 6 to the electron drawing electrode 9 are greater than those to the anode electrode 10 through the mesh part 9a, as shown by arrows in FIG. 6. As a result, the percentage of the grid current $I_G$ that does not contribute to light emission becomes high. It could be considered that the electrons, emitted from the electrode for the electronic source 6 not disposed directly beneath the mesh part 9, generate the grid current that less contributes to the light emission, i.e., wattless current. Through the studies of the present inventor, the conventional electrode structure could provide the current distribution percentage of 5 to 10%. When a space between the electron drawing electrode and the electrode for the electron source is narrow, they may be undesirably contacted each other.

Generally, the electron emitting source is formed on the surface of the flat solid conductive substrate. Alternatively, the conductive substrate may have a plurality of holed on its surface. When the electron emitting source is formed on such a substrate with holes by a dry method such as a CVD method, the electron emitting source such as carbon nanotube is formed not only on a front surface of the substrate, but also on a rear surface of the substrate through the holes. The electron emitting source formed on the rear surface opposite to the surface from which the electrons are emitted is not easily removed by a blower. Therefore, there is the following problems.

(1) When the conductive substrate on which the electron emitting source is formed is fixed to other base metal, the electron emitting source is caught between the conductive substrate and the base metal, whereby it is difficult to form the flat electrode, and repeatability of a gap between the electron drawing electrode and the electrode for the electronic source becomes poor.

(2) Since the conductive substrate is welded to the base metal via the electron emitting source such as the carbon nanotube, welding strength is decreased.

(3) The electron emitting source enters into the space between the electron drawing electrode and the electrode for the electron source when the electrode is assembled, thereby causing a contact problem.

SUMMARY OF THE INVENTION

An object of the present invention is to provide an electrode for an electron source, a method for producing the same, and an electronic tube using the same, where the percentage of anode current increases in the total current if a space between an electron drawing electrode and the electrode for the electron source is narrow, thereby improving the current distribution percentage.

One aspect of the present invention is an electrode for an electron source comprising a substrate, an electron emitting source area formed on the substrate, and a shield area surrounding the electron emitting source area; wherein the shield area is formed of a material that does not produce an electron emitting source when the electron emitting source is produced by a dry method.

The electron emitting source area has a surface that is formed of iron, or an iron based material.

The shield area has a surface formed of a non-ferrous material other than iron or an iron based material.

In order to enhance the current distribution percentage in the electronic tube, there may be a countermeasure to mask the area of the electrode for the electronic source other than the area directly beneath the mesh part 9a with a metal cover. As the gap between the electron drawing electrode and the electrode for the electronic source is as short as possible, more electrons can be emitted at lower voltage. Typically, the electrode gap is set to 100 to 200 $\mu$m. The metal cover generally has a thickness of about 70 $\mu$m. For example, when the electrode gap is set to 100 $\mu$m, the gap between the metal cover and the electronic drawing electrode is 30 $\mu$m. If the gap between the metal cover and the electronic drawing electrode is 30 $\mu$m, the metal cover may be easily contacted with the electronic drawing electrode due to distortion of the metal cover, and burrs upon welding. Thus, the electrons cannot be drawn. When the metal cover has a thickness of about 50 $\mu$m, the metal cover itself may be deformed upon fixing. If the electrode gap is too great, a voltage for drawing the electrons may be increased. Even if the electrode for the electronic source is masked with the metal cover, a manufacturing yield may be decreased in order to utilize a practical driving voltage, i.e., about 300 V or less. Also, the numbers of parts are increased, which might cause an increase in manufacturing costs.

According to the present invention, the shield area of the electrode for the electronic source is formed of a material that does not produce an electron emitting source when the electron emitting source is produced by a dry method. The electron emitting source such as carbon nanotube can be produced selectively within the electron emitting source area. In addition, the thickness around the electron emitting source area can be thin, whereby the current distribution percentage can be improved.

Other aspect of the present invention is an electrode for an electron source, comprising a substrate comprising iron or an iron based material having a plurality of holes, and an electron emitting source area formed on one surface of the substrate; wherein a material is formed on an opposite surface of the substrate; the material does not produce electron emitting source, when the electron emitting source is produced on the electron emitting source area by a dry method.

According to the present invention, the material that does not produce electron emitting source is formed on the rear surface of the substrate opposite to the surface where the electron emitting source area is formed, whereby no carbon nanotube is produced to make the rear surface flat. As a result, repeatability of a gap between the electron drawing electrode and the electrode for the electronic source is improved, when the substrate is fixed to other base metal. Also, welding strength is improved upon fixing.

Still other aspect of the present invention is a method for producing an electrode for an electron source, comprising the steps of printing a copper paste around an electron emitting source area having a surface made of iron or an iron based material in a substrate, firing the copper paste under reducing atmosphere, and producing an electron emitting source on the substrate using a gas of electron emitting material.

By using the printing method, the copper layer can be easily formed in any shape. In addition, the electron emitting source is produced by the dry method using the gas of the electron emitting material, the electrode can be formed at the proper portion as required.

Yet another aspect of the present invention is an electronic tube in which electrodes are accommodated in an envelope, comprising: an electrode for an electron source, an electron drawing electrode having a mesh portion formed substantially parallel to the electrode for the electron source of the present invention, and an anode electrode disposed in face of the electrode for the electron source such that the electron drawing electrode is sandwiched therebetween; wherein an electron emitting source is disposed in an area in face of the mesh portion.

By using the above-mentioned electrode for the electron source of the present invention, a distance between the electrode for the electron source and the electron drawing electrode can be short, whereby the electron drawing current can be lowered to save the power. Furthermore, no metal cover is used, whereby the numbers of the parts can be decreased to improve the manufacturing yield.

DETAILED DESCRIPTION OF THE PREFERRED EMBODIMENTS

Figure 1:
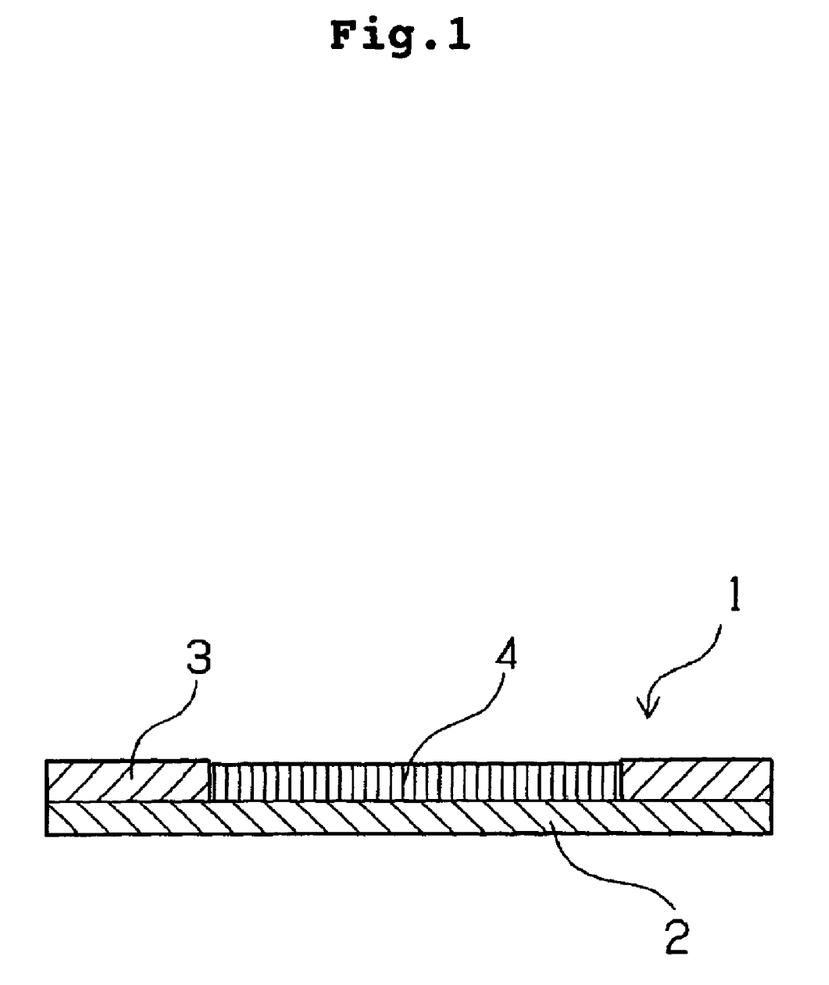
FIG. 1 is a cross-sectional view showing an example of an electrode for an electron source.
Figure 2:
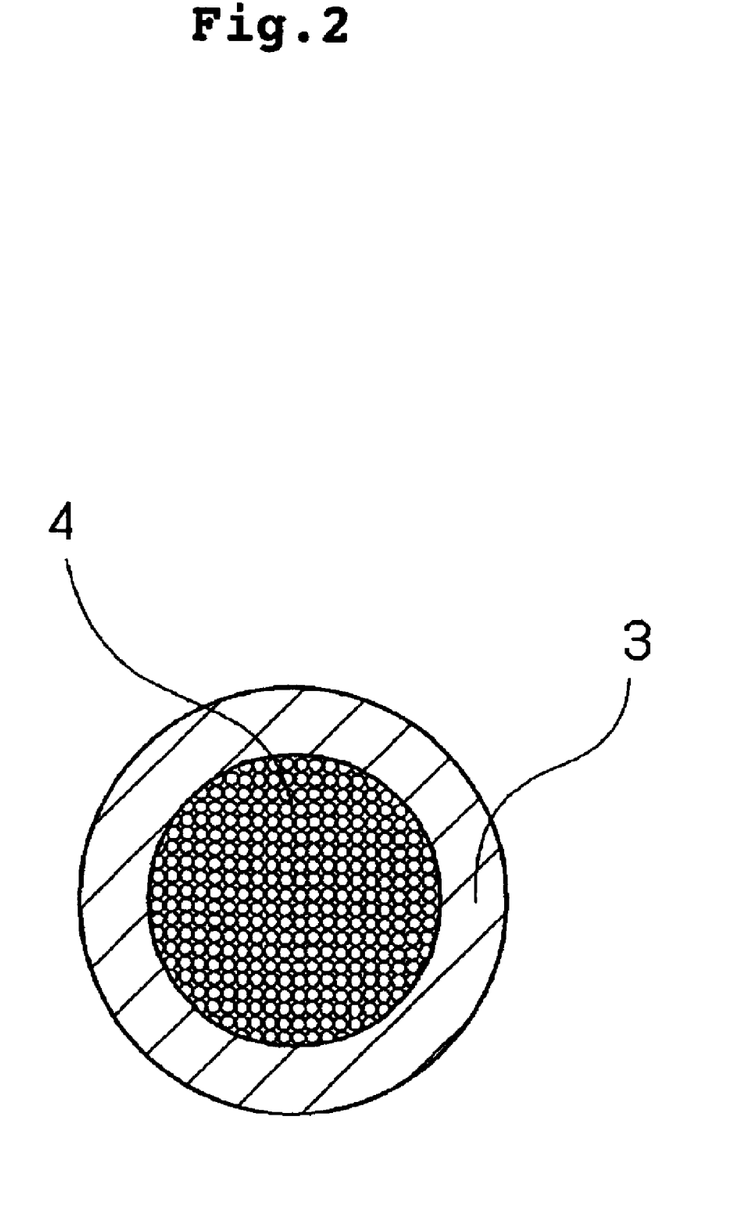
FIG. 2 is a plan view showing an example of an electrode for an electron source.

Referring to FIGS. 1 and 2, the electrode for the electronic source according to the present invention will be described.

The electrode for the electronic source 1 comprises the substrate 2, the shield area 3 obtained by printing a thick film of a copper paste on the substrate 2, and then firing it under reducing atmosphere, and the electron emitting source area 4 surrounded by the shield area 3.

The substrate 2 has a surface made of the material that can produce the electron emitting source such as carbon nanotube by a dry method. For example, there is the substrate made of iron, an iron alloy, and ceramics such as glass and forsterite, on which iron or an iron based material is formed.

Examples of iron or the iron based material include a metal thin plate having approximately the same thermal expansion coefficient as that of the material of the electron drawing electrode as described later. Specifically, it can be recited the thin plates of 426 alloy, 42 alloy, 36 alloy, stainless steel (SUS304), an iron-nickel alloy, cast iron, pure iron and the like.

The electron emitting source area 4 is formed on the substrate 2 by the dry method. The dry method herein means a method for forming a carbon based electron emitting source such as the carbon nanotube mainly by vapor phase epitaxy, including laser vapor deposition, resistance heating, a plasma method, a thermal CVD (chemical vapor deposition) method, a microwave plasma CVD method, an electron beam vapor deposition and the like. Preferably, a reaction gas is introduced under an inert gas or hydrogen gas. More preferably, carbon monoxide is introduced under hydrogen gas to precipitate the thermally decomposed components as the carbon nanotube on the substrate.

The electron emitting source can be made of any material that easily emits the electrons, for example, that has about 20 V/$\mu$m or less of electron emission threshold value field, and does not produce the electron emitting source at the shield area. Other than the carbon nanotube, examples include carbon based electron emitting materials such as diamond-like carbon (DLC), single crystal diamond, polycrystalline diamond, amorphous diamond, amorphous carbon and the like.

The shield area 3 is formed with a material which does not initiate the vapor phase epitaxy of the carbon based electron emitting source such as the carbon nanotube. In the present invention, it is preferable that the material be non-ferrous material including no iron. Suitable non-ferrous materials include copper, nickel, cobalt, molybdenum, titanium, tungsten, a non-ferrous containing one or two or more thereof, or ceramics.

The shield area 3 is formed by, for example, a printing method, electroless plating, laser vapor deposition, resistance heating, a plasma method, a thermal CVD method, a microwave plasma CVD method, an electron beam vapor deposition and the like.

In particular, when the copper paste is printed at the predetermined thickness, and fired it under reducing atmosphere, an conductive layer is provided. Using the conductive layer, a copper layer can be formed by introducing carbon monoxide under hydrogen gas that does not induce catalytic action upon production of the electron emitting source, whereby no carbon nanotube is produced.

The shield area 3 preferably has the thickness of 1 to 50 $\mu$m, although it depends on the methods for forming the shield area. Within the range, the formation of the electron emitting source on the shield area can be prevented.

It is preferable that the thicknesses of the electron emitting source area 4 and the shield area 3 in the electrode for the electron source 1 be approximately the same. When they are approximately the same, a distance between the electrode for the electron source and the electron drawing electrode can be shorten, when the electronic tube is assembled. As a result, the numbers of electrons that flow into the electron drawing electrode increase, which leads to the improved current distribution percentage of the electronic tube.

The electron emitting source area 4 may be flat shape, or have a plurality of holes, or protrusions on the surface. The electron emitting source is formed on the surface of the thus-shaped electron emitting source area 4 at the electron drawing electrode side. It is preferable that the electron emitting source area 4 be flat since the shield area 3 is easily formed.

Figure 3:
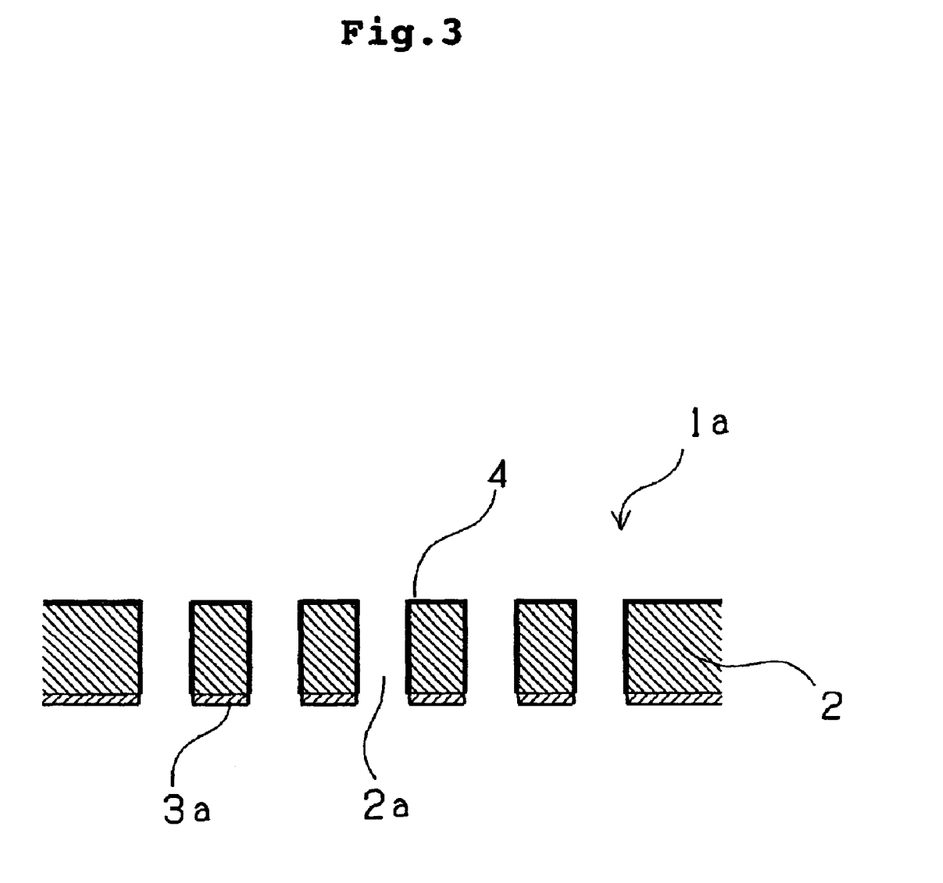
FIG. 3 is a cross-sectional view showing an electrode part of an electron emitting source area.

Now, referring to FIG. 3, the electrode for the electron emitting source having a plurality of holes will be described.

The electrode for the electron emitting source 1a comprises the flat conductive substrate 2 with plurality of holes 2a, and the shield area 3a on the rear surface of the conductive substrate 2. When dry vapor phase epitaxy is performed using the electrode substrate, the electron emitting source 4 is formed except the rear surface of the shield area 3a.

The above-mentioned non-ferrous materials can be used for the shield area 3a. For example, the aforementioned copper layer using the copper paste can be used.

A method for producing the electrode for the electron source 1 shown in FIG. 1 will be described.

On the surface of the substrate 2 comprising iron or the iron containing material, the copper paste is printed as the thick film around the electron emitting source area 4. Well known copper pastes and the thick film printing methods can be utilized.

For example, the electron emitting source area 4 may 34; have the groups of electrodes that are formed electrically independently on the surface of the substrate 2. In this case, respective electrodes for the electron source are controlled separately, thereby providing such display tube suitable for static driving. Alternatively, they may be disposed in three stripes for color display. Thus-formed electrodes emit electrons to a phosphor layer comprising red (R), green (G), and blue (B) forming one pixel at the anode electrode, respectively. When the electrodes for the electron sources and the electron drawing electrodes that are also disposed in stripes are crossed, there are provided intersection points in a matrix. Thus, a color display tube suitable for dynamic driving is provided.

The copper paste is fired under reducing atmosphere to form the shield area. Examples of the reducing atmosphere include nitrogen gas, hydrogen gas, a mixed gas of nitrogen and hydrogen, and argon gas. The copper paste is preferably fired at the temperature within the range of 600 to 900° C. for 10 to 30 minutes, although the temperature and the time depend on the types of the copper paste. The shield area preferably has the thickness of 5 to 50 $\mu$m.

Finally, the electron emitting source is produced at the electrode forming area of the substrate using the raw material gas of the electron emitting material.

Figure 5:
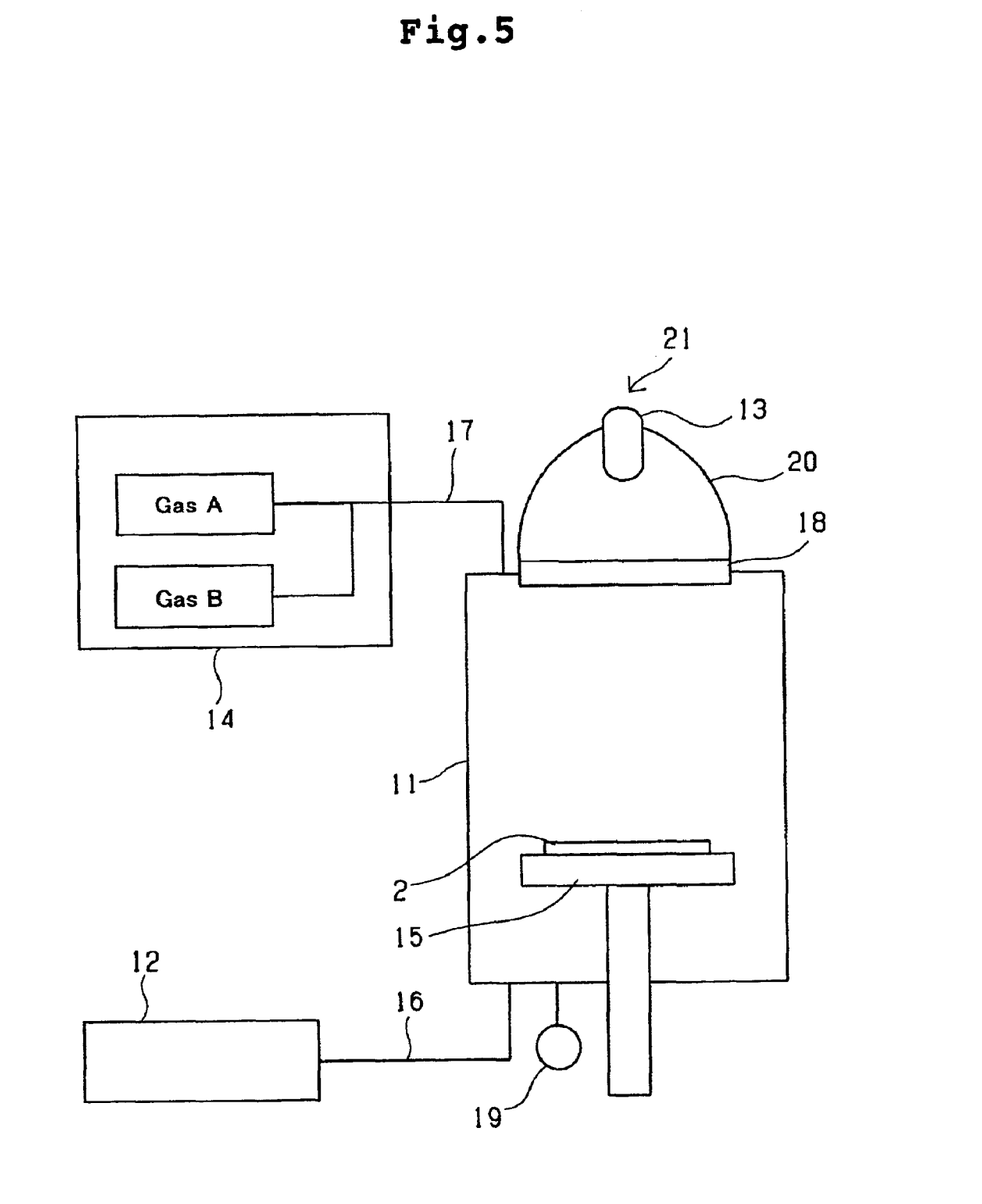
FIG. 5 is a diagram showing an apparatus for producing an electron emitting source by a thermal CVD method.

Referring to FIG. 5, an apparatus and a method for producing the electron emitting source will be described.

The apparatus for producing the electron emitting source 21 comprises a reaction vessel 11 having a holder 15 for mounting the substrate 2, a gas supply means 14 for supplying the reaction gases to the reaction vessel 11, an exhaust means 12, and an infrared ray lamp 13 for heating the substrate 2.

After the substrate 2 on which the shield area is formed is mounted on the holder 15, the reaction vessel 11 was vacuum exhausted to about 1 Pa via an exhaust tube 16 with the exhaust means 12.

Then, the substrate 2 was heated by lighting the infrared ray ramp 13. The temperature is increased to about 650° C. and stabilized. The apparatus for producing the electron emitting source 21 further comprises a quartz glass 18, and a reflecting mirror 20. Carbon monoxide and hydrogen gas are supplied from the gas supplying means 14 to the reaction vessel 11 via an exhaust tube 17 such that the concentration of the carbon monoxide is 30%. While the mixed gas is flowing, the reaction vessel 11 is kept at about 101 kPa (about 1 atm) for about 30 minutes. A film of carbon nanotube fiber is propagated on the surface, which becomes the electron emitting source area, surrounded by the shield area of the substrate 2. Thereafter, the supply of the mixed gas is stopped, and the infrared ray lamp 13 is turned off. The reaction vessel 11 is vacuum exhausted to about 1 kPa, and then returned to about 1 atm. There is provided the substrate 2 on which the carbon nanotube fiber is formed on the electron emitting source area surrounded by the shield area.

Other examples of the raw material gases for forming the electron emitting source include the mixing gas of methane and hydrogen, or carbon dioxide and hydrogen.

Suitable conditions for forming the carbon nanotube fiber are as follows: the concentration of the methane gas is 30% in the mixed gas, the temperature of the conductive substrate is about 850° C., and the holding time is about 60 minutes, when the mixed gas is methane and hydrogen; the concentration of the carbon dioxide gas is 30% in the mixed gas, the temperature of the conductive substrate is about 650° C., and the holding time is about 30 minutes, when the mixed gas is carbon dioxide and hydrogen.

Figure 4:
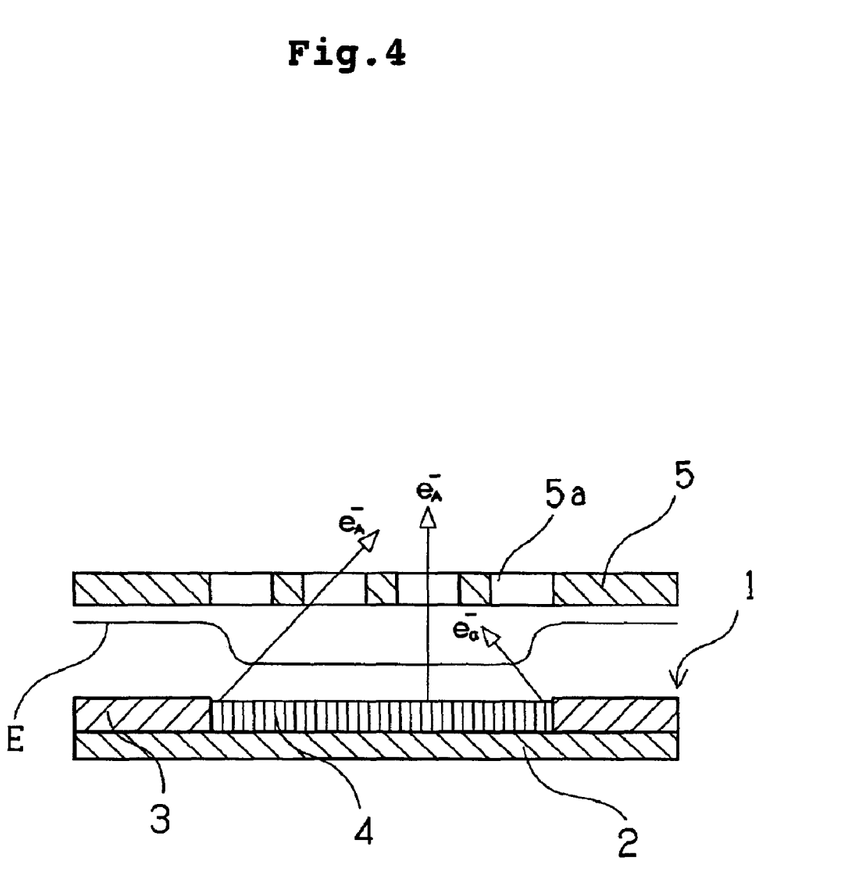
FIG. 4 is a diagram showing an electrode structure of an electrode for an electron source and an electron drawing electrode in an electron tube.

FIG. 4 shows an example of an electron tube according to the present invention. In FIG. 4, the electron tube comprises the electrode for the electron source 1 shown in FIG. 1, and the electron drawing electrode 5 formed approximately parallel to the electrode for the electron source 1. The electron drawing electrode 5 has a mesh part 5a including a plurality of small openings. The electronic emitting source area 4 of the electrode for the electron source 1 is disposed directly beneath the mesh part 5a. Above the electron drawing electrode 5, an anode electrode (not shown) is formed, and is accommodated in the vacuum chamber.

In the electrode structure shown in FIG. 4, the shield area 3 formed with the conductive material is disposed around the electron emitting area 4. A potential distribution E becomes concave as shown in FIG. 4. In other words, the potential in the shield area 3 is higher than that in the electron emitting source area 4. With the change in the potential distribution, the electrons are emitted from edge portions (peripheral rims) of the electron emitting source area 4 to the inside in an upper oblique direction. The numbers of the electrons passing the mesh part 5a of the electron drawing electrode 5 are increased. This is because the concave potential distribution E acts as a lens so that the electrons emitted from the electron emitting source electrode 4 are collected inside. On the other hand, the electrons are not emitted from the shield area 3, and the numbers of the electrons flowing into the electron drawing electrode 5 are decreased. As a result, the percentage of anode current $I_A$ increases in the total current, thereby improving the current distribution percentage. Using the electrode structure shown in FIG. 4, the electron tube was fabricated. When the electron emitting source area 4 had the thinner thickness than the shield area 3, the current distribution percentage was 30%. When the electron emitting source area 4 had the same thickness as that of the shield area 3, the current distribution percentage was 50%. For reference, the current distribution percentage was 5% in the electrode structure shown in FIG. 6.

The electrode for the electron source according to the present invention has the excellent current distribution percentage, and therefore can be utilized as the electron source for the fluorescent display tubes such as a flat type fluorescent display tube, a cylindrical fluorescent display tube, and a field-effect diode (FED).

Examples of the electrode for the electron source according to the present invention will be described below.

EXAMPLE 1

A copper paste comprising copper powder and a binder was formed on a shield area of a substrate made of 426 alloy by a screen printing method, and was fired at 550° C. for 30 minutes under nitrogen gas. A mixed gas of carbon monoxide and hydrogen was flowed onto the substrate at 700° C. to form a carbon nanotube layer by a thermal CVD method for 30 minutes. As a result, a layer of carbon nanotube having an average thickness of 10 μm was formed on the area where no copper was formed. On the other hand, no carbon nanotube was formed on the shield area. The thickness of the copper layer was 10 μm.

EXAMPLE 2

A substrate made of a 426 alloy was overlaid with a metal mask having an opening with the same shape as a shield area. A copper film was formed in a thickness of 1 μm on the shield area at 250° C. by vacuum vapor deposition. A mixed gas of carbon monoxide and hydrogen was flowed onto the substrate at 650° C. to form a carbon nanotube layer by a thermal CVD method for 10 minutes. As a result, a layer of carbon nanotube having an average thickness of 10 μm was formed on the area where no copper was vacuum vapor deposited. On the other hand, no carbon nanotube was formed on the shield area where the copper was vacuum vapor deposited.

EXAMPLE 3

A nickel layer was formed in a thickness of 10 μm on a whole surface of a substrate made of an iron alloy by an electroless plating method. The nickel was removed by a chemical etching using a photoresist other than the nickel formed on the shield area. The carbon nanotube was formed on the substrate as EXAMPLE 1. As a result, a layer of carbon nanotube was formed on only the area where the electroless plated nickel was removed.

EXAMPLE 4

The carbon nanotube was formed as EXAMPLE 3 except that a titanium crude layer was formed in a thickness of 50 μm on the shield area of the substrate. As a result, no carbon nanotube layer was formed on the titanium crude layer. The carbon nanotube layer was favorably formed only on the required area.

EXAMPLE 5

A substrate was overlaid with a metal mask having an opening with the same shape as a shield area. A titanium layer was formed in a thickness of 0.2 μm on the shield area at 200° C. by a sputtering method under argon gas atmosphere using a pure titanium target as a target. A mixed gas of carbon monoxide and hydrogen was flowed onto the substrate at 650° C. to form a carbon nanotube layer by a thermal CVD method for 10 minutes. As a result, a layer of carbon nanotube having an average thickness of 10 μm was formed on only the area where no titanium was formed.

According to the electrode for the electron source of the present invention, the electron emitting source such as the carbon nanotube is selectively produced in the electron emitting source area, and no electron emitting source is produced on the shield area with certainty. Accordingly, the current distribution percentage of the electron tube formed therewith is improved.

According to another electrode for the electron source using the substrate having a plurality of holes of the present invention, the repeatability of a gap between the electron drawing electrode and the electrode for the electronic source is improved even if the conductive substrate is fixed to the base metal. In addition, welding strength is improved upon fixing.

According to the method for producing the electrode for the electronic source of the present invention, a copper layer, which becomes the shield area, can be easily formed in any shapes. Also, the electrode for the electronic source can be formed at any required portions. Furthermore, no metal cover is used, whereby the numbers of parts are decreased, resulting in an improved manufacturing yield.

According to the electron tube of the present invention, the current distribution percentage is improved, and the electron drawing current is lowered, resulting in power saving.

What is claimed is:
1. An electrode, for an electron source, comprising:
a substrate,
an electron emitting source area formed on the substrate,
a shield area surrounding the electron emitting source area and an electron drawing electrode having a mesh portion formed substantially parallel to the electrode for the electron source;

wherein the shield area is formed of a material that does not produce an election emitting source when the electron emitting source is produced on the electron emitting source area by a dry method, wherein the shield area has a surface formed of a non-ferrous material, wherein the non-ferrous material is copper, nickel, cobalt, molybdenum, titanium, tungsten, or non-ferrous alloy containing one or two or more thereof.

2. An electrode tube, in which electrodes are accommodated in an envelope comprising:

an electrode for an electron source, an electron drawing electrode having a mesh portion formed substantially parallel to the electrode for the electron source, and an anode electrode disposed facing of the electrode for the electron source such that the electron drawing electrode is sandwiched therebetween;

wherein the electrode for the electron source comprises a substrate, an electron emitting source area formed on the substrate, and a shield area surrounding the electron emitting source area, said shield area being formed of a material that does not produce an electron emitting source when the electron emitting source is produced on the electron emitting source area by a dry method, and an electron emitting source is disposed in an area facing of the mesh portion, wherein the shield area has a surface formed of a non-ferrous material, wherein the non-ferrous material is copper, nickel, cobalt, molybdenum, titanium, tungsten, or non-ferrous alloy containing one or two or more of said non-ferrous materials.

3. An electrode tube in which electrodes are accommodated in an envelope, comprising:

an electrode for an electron source, an electron drawing electrode having a mesh portion formed substantially parallel to the electrode for the electron source, and an anode electrode disposed facing of the electrode for the electron source such that the electron drawing electrode is sandwiched therebetween;

wherein the electrode for the electron source comprises an iron or an iron based material having a plurality of holes, said material does not produce an electron emitting source on an opposite surface to the electron emitting source area by a dry method, wherein the material that does not produce the electron emitting source is a non-ferrous material, wherein the non-ferrous material is copper, nickel, cobalt, molybdenum, titanium, tungsten, or a non-ferrous alloy containing one or two or more of said non-ferrous materials.

* * * * *